United States Patent
Meijer et al.

(10) Patent No.: US 8,719,143 B2
(45) Date of Patent: May 6, 2014

(54) DETERMINATION OF OPTIMIZED LOCATION FOR SERVICES AND DATA

(75) Inventors: Henricus Johannes Maria Meijer, Mercer Island, WA (US); Gary W. Flake, Bellevue, WA (US); Arnold N. Blinn, Hunts Point, WA (US); William J. Bolosky, Issaquah, WA (US); Lili Cheng, Bellevue, WA (US); Michael Connolly, Seattle, WA (US); Alexander G. Gounares, Kirkland, WA (US); James R. Larus, Mercer Island, WA (US); Matthew B. MacLaurin, Woodinville, WA (US); Debi P. Mishra, Bellevue, WA (US); Amit Mital, Kirkland, WA (US); Ira L. Snyder, Jr., Bellevue, WA (US); David R. Treadwell, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1723 days.

(21) Appl. No.: 11/613,232

(22) Filed: Dec. 20, 2006

(65) Prior Publication Data

US 2008/0080497 A1 Apr. 3, 2008

Related U.S. Application Data

(63) Continuation-in-part of application No. 11/536,554, filed on Sep. 28, 2006.

(51) Int. Cl.
*G06Q 40/00* (2012.01)
*G06Q 30/08* (2012.01)
*G06Q 30/06* (2012.01)

(52) U.S. Cl.
CPC ............... *G06Q 30/08* (2013.01); *G06Q 40/00* (2013.01); *G06Q 30/0611* (2013.01)
USPC .............................................. 705/37; 705/35

(58) Field of Classification Search
CPC ..... G06Q 40/00; G06Q 30/08; G06Q 30/0611
USPC ....................................................... 705/37, 35
See application file for complete search history.

(56) References Cited

U.S. PATENT DOCUMENTS

| | | | |
|---|---|---|---|
| 5,263,165 | A | 11/1993 | Janis |
| 5,495,576 | A | 2/1996 | Ritchey |

(Continued)

FOREIGN PATENT DOCUMENTS

| | | |
|---|---|---|
| EP | 0915595 (A2) | 5/1999 |
| EP | 1058429 (A1) | 12/2000 |

(Continued)

OTHER PUBLICATIONS

Rick Edvalson, "Commentary: Guard against data disaster—Backup!", Sep. 15, 2005, Daily Record and the Kansas City Daily News-Press, Kansas City, MO, pp. 1-2.*

(Continued)

*Primary Examiner* — Kirsten Apple
*Assistant Examiner* — Scott S Trotter
(74) *Attorney, Agent, or Firm* — Dan Choi; Carole Boelitz; Micky Minhas

(57) ABSTRACT

The claimed subject matter provides a system and/or a method that facilitates preserving and maintaining data and/or services associated with a network service. The network service can be any collection of resources that are maintained by a party (e.g., third-party, off-site, etc.) and accessible by an identified user over a network (e.g., WAN, Internet, etc.). An interface component can receive a termination notification related to the network service. An executor component can relocate at least a portion of one of data and a service associated with the terminated network service to a disparate replacement network service in order to preserve any services and/or data related therewith.

17 Claims, 12 Drawing Sheets

(56) References Cited

U.S. PATENT DOCUMENTS

| | | | |
|---|---|---|---|
| 5,537,404 | A | 7/1996 | Bentley et al. |
| 5,588,914 | A | 12/1996 | Adamczyk |
| 5,678,044 | A | 10/1997 | Pastilha et al. |
| 5,765,173 | A * | 6/1998 | Cane et al. ............... 707/640 |
| 5,859,972 | A | 1/1999 | Subramaniam et al. |
| 6,064,656 | A | 5/2000 | Angal et al. |
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,606,744 | B1 | 8/2003 | Mikurak |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,934,755 | B1 | 8/2005 | Saulpaugh et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,085,826 | B2 | 8/2006 | French et al. |
| 7,117,228 | B2 * | 10/2006 | Tomita et al. ............... 1/1 |
| 7,284,043 | B2 | 10/2007 | Feinleib et al. |
| 7,330,997 | B1 * | 2/2008 | Odom ............... 714/6.23 |
| 7,373,377 | B2 | 5/2008 | Altieri |
| 7,383,218 | B1 | 6/2008 | Oros |
| 7,454,462 | B2 | 11/2008 | Belfiore et al. |
| 7,536,581 | B2 | 5/2009 | Fiske |
| 7,580,872 | B2 * | 8/2009 | Van Slyke et al. ............... 705/35 |
| 7,684,417 | B2 * | 3/2010 | Imai et al. ............... 370/401 |
| 7,953,655 | B1 * | 5/2011 | Brewer ............... 705/37 |
| 2002/0124053 | A1 | 9/2002 | Adams et al. |
| 2003/0105734 | A1 | 6/2003 | Hitchen et al. |
| 2003/0229623 | A1 | 12/2003 | Chang et al. |
| 2004/0049537 | A1 | 3/2004 | Titmuss |
| 2004/0076160 | A1 | 4/2004 | Phaltankar |
| 2004/0098456 | A1 | 5/2004 | Krzyzanowski et al. |
| 2004/0128382 | A1 | 7/2004 | Shimoda et al. |
| 2004/0224646 | A1 * | 11/2004 | Bae ............... 455/90.3 |
| 2005/0033669 | A1 | 2/2005 | Stremler et al. |
| 2005/0038848 | A1 | 2/2005 | Kaluskar et al. |
| 2005/0083862 | A1 | 4/2005 | Kongalath |
| 2005/0138419 | A1 | 6/2005 | Gupta et al. |
| 2005/0238024 | A1 | 10/2005 | Taylor et al. |
| 2005/0255856 | A1 | 11/2005 | Griffin et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0178918 | A1 | 8/2006 | Mikurak |
| 2007/0005680 | A1 | 1/2007 | Jrad et al. |
| 2007/0088630 | A1 | 4/2007 | MacLeod et al. |
| 2007/0115123 | A1 | 5/2007 | Roberts et al. |
| 2007/0136572 | A1 | 6/2007 | Chen et al. |
| 2007/0174214 | A1 | 7/2007 | Welsh et al. |
| 2008/0021997 | A1 | 1/2008 | Hinton |
| 2008/0072222 | A1 | 3/2008 | Bantz et al. |
| 2008/0083031 | A1 | 4/2008 | Meijer et al. |
| 2008/0247320 | A1 | 10/2008 | Grah et al. |

FOREIGN PATENT DOCUMENTS

| | | |
|---|---|---|
| EP | 1376309 (A2) | 1/2004 |
| EP | 1524580 (A2) | 4/2005 |
| EP | 1564622 (A2) | 8/2005 |
| JP | 2001282634 (A2) | 10/2001 |
| KR | 1020040038271 | 5/2004 |
| KR | 1020040107152 | 12/2004 |
| KR | 1020060057563 | 5/2006 |
| WO | WO0008814 (A1) | 2/2000 |
| WO | WO2004002107 (A1) | 12/2003 |
| WO | 2005022826 | 10/2006 |

OTHER PUBLICATIONS

Unknown, "Demand for Continious Data Protection Solutions Drives LiveVault to Expand Channel Program", Aug. 15, 2005, PR Newswire, New York, pp. 1-3.*

Unknown, "Lumitrend Extends Global Reach by Offering the First Online Backup Solution for Java-Compatible Cell Phones", Sep. 26, 2005, PR Newswire, New York, pp. 1-2.*

Ken Belson, Industry picks up pieces os Ebbers trial begins, Jan. 18, 2005, International Herald Tribune, p. 15.*

Unknown, "Latest scam targets AOL users", Oct. 16, 1999; Albuquerque Journal, pp. D10.*

Unknown, Michael Jackson glove, Feb. 10, 1992, Star Tribune Minneapolis, p. 2B.*

Cisco Lifecycle Services for Cisco Optical Network Systems. Service Overview http://www.cisco.com/en/US/solutions/collateral/ns340/ns517/ns224/net_brochure0900aecd80536dff.pdf. Last accessed Nov. 27, 2008, 6 pages.

Riva, et al. Mobile Services: Context-Aware Service Migration in Ad Hoc Networks http://www.cs.rutgers.edu/~iftode/mobservice.pdf. Last accessed Nov. 27, 2008, 14 pages.

Brown, et al. ISTORE: Introspective Storage for Data-Intensive Network Services http://www.hpl.hp.com/personal/Kimberly_Keeton/BerkeleyPapers/istore-hotos99.ps. Last accessed Nov. 27, 2008, 6 pages.

Lim, et al. Authentication Protocols for Service Mobility using Forward Secrecy Cryptosystems. The Institute of Electronics, Information and Communication Engineers, Technical Report of IEICE. http://www.mlab.t.u-tokyo.ac.jp/attachment/file/25/lim_MoMuC2007-23.pdf. Last accessed Nov. 27, 2008, 6 pages.

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

(56) References Cited

OTHER PUBLICATIONS

Hughes, et al. Automated Verification of Access Control Policies. http://www.cs.ucsb.edu/~bultan/publications/tech-report04.pdf. Last accessed Sep. 20, 2006.
Cederquist, et al. An Audit Logic for Accountability. 2005. http://www.citebase.org/fulltext?format=application/pdf&identifier=oai:arXiv.org:cs/0502091. Last accessed Sep. 20, 2006.
Office action for U.S. Appl. No. 11/536,554, mailed on May 30, 2013, Gounares et al., "Identifying a Network Service Termination and Migrating Data to a New Network Service", 24 pages.
Office action for U.S. Appl. No. 11/536,554, mailed on Oct. 17, 2013, Gounares et al., "Identifying a Network Service Termination and Migrating Data to a New Network Service", 18 pages.

* cited by examiner

DETERMINATION OF OPTIMIZED LOCATION FOR SERVICES AND DATA

CROSS REFERENCE TO RELATED APPLICATION(S)

This continuation-in-part application claims the benefit of U.S. patent application Ser. No. 11/536,554 filed on Sep. 28, 2006, entitled "MIGRATING DATA TO NEW CLOUD." The entirety of which application is incorporated herein by reference.

BACKGROUND

Technological advances in computer hardware, software and networking have lead to efficient, cost effective computing systems (e.g., desktop computers, laptops, handhelds, cell phones, servers . . . ) that can communicate with each other from essentially anywhere in the world in order to exchange information. These systems continue to evolve into more reliable, robust and user-friendly systems. As a result, more and more industries and consumers are purchasing computers and utilizing them as viable electronic alternatives to traditional paper and verbal media for exchanging information. For example, many industries and consumers are leveraging computing technology to improve efficiency and decrease cost through web-based (e.g., on-line) services. For instance, consumers can search and retrieve particular information (e.g., via a search engine), purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms . . . ), etc. with the click of a mouse.

A large and ever-growing amount of computer software is readily available to consumers in light of such a dramatic increase in use, demand, availability, and decrease in cost. Based on such vast and broad functionality associated with computers, computer software exists for essentially any market, activity, computation, and/or computer-related implementation. For instance, software can be related to accounting, word processing, data management, electronic mail message, virus protection, data synchronization, digital photograph manipulation, media management, operating systems (OS), update control, audio, graphic design, architecture, taxes, browsers, document readers, games, communications, security, networking, etc.

With the advent of highly sophisticated computer software and/or hardware, servicing areas associated therewith have stormed into existence in order to meet consumer high-demands. Typically, computational services are undertaken upon a client or within a proprietary intranet. Client-side systems are employed to manage relationships between users, software applications, services, and hardware within a client machine, as well as data resident upon a respective intranet. However, in addition to client-side systems providing services, off-site systems (e.g., third party) can also provide services in order to improve data capability, integrity, reliability, versioning, security, and mitigate costs associated therewith.

In general, these services can be employed to manage relationship between users, provide software applications, enhance hardware capabilities, manage data, optimize security, etc. For example, a third party service can enable a client to store data therewith limited solely by the third party capabilities (e.g., hardware, software, etc.). With such increase in growth related to servicing businesses, a portion of such may not be able survive and will likely be terminated based on planned events (e.g., retirement, strike, closing, shut downs, etc.) or unforeseen circumstances such as, loss of profits, death of owner(s), bankruptcy, and the like. Following the brief example above, if the third party service ceases to exist, a remedy must be available to enable the client to retrieve uploaded data. Thus, upon death of a business that provides a service, various problems and/or issues may arise, wherein conventional solutions are costly, inefficient, non-existent, meticulous, and pain-staking. Users may want to migrate data and/or services for other reasons as well. For instance, users may be able to get cheaper and/or better services elsewhere (e.g. this can be a common problem associated with hosting a website). In another instance, data can be migrated based on machine deterioration, virus infections (e.g. getting "sick"), and/or replaced. Thus, a user may want to migrate data from an old machine to a newly purchased machine.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate migrating at least one of a portion of a service and data related to a terminated network service to a replacement network service. An executor component can migrate data, metadata, and/or a service from a network service that has and/or is about to dissolve to a replacement network service in order to provide uninterrupted services to a user and/or client. Moreover, such migration of data, metadata, and/or a service can preserve and/or maintain such data, metadata, and/or a service in light of any circumstances related to the network service such as dissolving, terminated business, files bankruptcy, closes, retires, shuts down, strikes, dissolves, buyout, ceases to exist, terminating services, etc. In particular, the executor component can receive a termination notification via an interface, wherein the executor component can evaluate the terminating and/or terminated network service to identify an analogous and/or substantially similar replacement network service to migrate data, metadata, and/or a service thereto.

The network service and/or the replacement network service can refer to any collection of resources that are maintained by a party (e.g., off-site, on-site, third party, etc.) and accessible by an identified user over a network (e.g., Internet, WAN, etc.). The network service and/or the replacement network service is intended to include any service, network service, cloud service, collection of resources, etc. and can be accessed by an identified user via a network. In addition, the network service and/or the network service can provide any suitable number of service(s) to any suitable number of user(s) and/or client(s).

In accordance with one aspect of the claimed subject matter, the executor component can utilize a detection component that facilitates detecting network services that have terminated and/or are in the process of terminating. Upon the detection of a terminated network service, the claimed innovation can revive the network service by utilizing any suitable rollback technique to enable a transactional system. Thus, the terminated network service can be rolled back to a state that allows data and/or service migration to be employed. The detection component can employ pinging, polling, requesting, and/or predictive techniques in order to identify a dying and/or dead network service. For example, the detection component can request a termination inquiry to a suspected network service that is believed to be on the verge of termination and/or dissolution.

In accordance with another aspect of the subject innovation, the executor component can employ an organizer component that can prioritize data related to a terminating and/or terminated network service. The organizer component can enhance efficiency based on eliminating and/or utilizing a hierarchy to sort data and/or services that are to be relocated to a replacement network service. In other words, the organizer component allows a portion of data and/or services from the terminated network service to be migrated to a replacement network service rather than the totality of data and/or services.

In accordance with yet another aspect of the claimed subject matter, a summary component can be utilized to provide a synopsis of services provided by any terminating and/or terminated network services. The summary component synopsis can be utilized by an assignment component, which can identify a substantially similar network service in comparison to the terminated and/or terminating network service. For instance, the assignment component can evaluate any available network services and determine which can be suitable replacements and/or substantially similar to any terminated and/or terminating network services. In other aspects of the claimed subject matter, methods are provided that facilitates preserving data and/or services related to a terminating and/or terminated network service.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
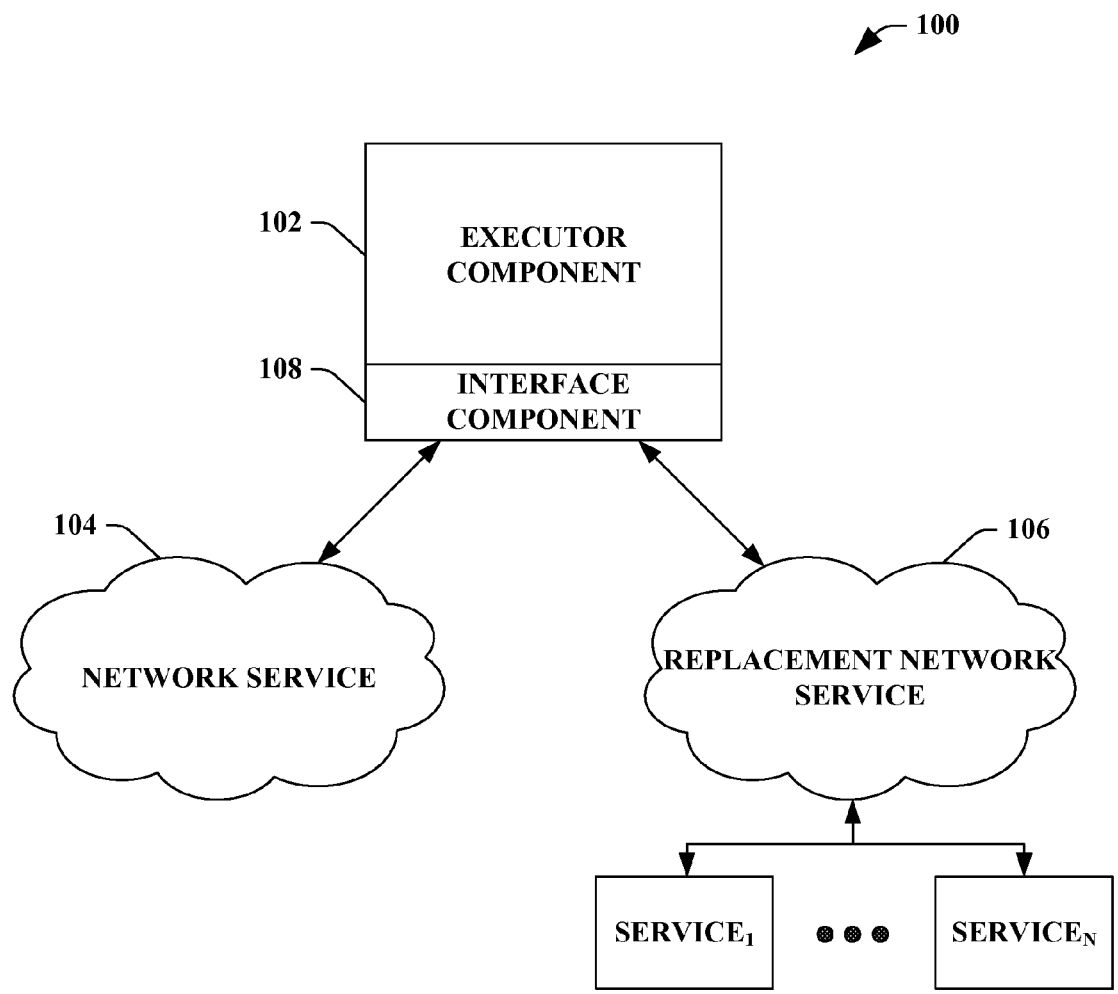
FIG. 1 illustrates a block diagram of an exemplary system that facilitates migrating data related to a terminated network service to a replacement network service.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "cloud," "service," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In addition, a "cloud" is intended to refer to a collection of resources (e.g., hardware and/or software) provided and maintained by an off-site party (e.g., third party), wherein the collection of resources can be accessed by an identified user over a network (e.g., Internet, WAN, . . . ). The resources can provide services including, without limitation, data storage services, word processing services, and many other services and/or applications that are conventionally associated with person computers and/or local servers. Thus, as utilized in the subject innovation, a cloud can provide a network service, a collection of resources, a portion of a service, and the like to at least one identified user. Moreover, such services and/or collection of resources can be specifically tailored to a particular user based on such identification data.

Now turning to the figures, FIG. 1 illustrates a system 100 that facilitates migrating data related to a terminated network service to a replacement network service. The system 100 can include an executor component 102 that can migrate data, metadata, and/or a service from a network service 104 that has and/or is about to dissolve to a replacement network service 106 in order to provide uninterrupted services to a user and/or client. In light of the network service 104 dying (e.g., dissolving, terminated business, files bankruptcy, closes, retires, shuts down, strikes, dissolves, buyout, ceases to exist, terminating services, users wanting to migrate data and/or services for a cheaper rate, users wanting to migrate data and/or services for a better service, migration of data and/or services based on machine deterioration, migration of data and/or services based on virus infections, data migration and/or service migration based on replaced machines/services, etc.), the executor component 102 can ensure seamless hand-off of most any portion of a service and/or data associated with the terminated network service 104 to the replacement network service 106 such that any service provided by the network service 104 can be employed by the replacement network service 106. In one particular example, the executor component 102 can receive a termination notification related to the network service 104 via an interface component 108 (discussed infra). Based on such termination notification, the suitable replacement network service 106 can be identified for data migration thereto. It is to be appreciated and understood that the executor component 102 can evaluate the dissolving network service 104 and identify a suitable and/or analogous network service that provides substantially similar resources and/or services. Moreover, it is to be appreciated that the system 100 can employ data migration (e.g., code migration, service replication, metadata migration, data transformation modules, code transformation modules, service transfer, etc.) when a network service has terminated, is terminating, and/or has plans to terminate and the subject innovation is not so limited to a particular moment in the termination and/or dissolution process. Furthermore, it is to be appreciated that the executor component 102 can provide any suitable data transfer to a disparate network service which can include metadata, services, portion of services, data transformation modules for adaptation, code transformation for adaptation, etc.

For instance, a user can subscribe to a network service that provides word processing applications. Based on circumstances known and/or unforeseen (e.g., planned dissolution, filing bankruptcy, retiring, a buyout, a termination of services based on geography, etc.), the network service can die and/or cease to exist. In such scenario, the system 100 can facilitate maintaining at least a portion of a service by re-assigning data and/or services to a disparate replacement network service. A replacement network service can be identified and/or created (discussed infra), wherein such replacement network service can mirror services from the terminated network service. By mirroring the services, the replacement network allows the user to maintain the network service that provides word processing applications (as discussed in this example) in a seamless and continuous manner.

In general, a network service and/or a replacement network service can refer to any collection of resources that are maintained by a party (e.g., off-site, on-site, third party, etc.) and accessible by an identified user over a network (e.g., Internet, WAN, etc.). It is to be appreciated and understood that a network service and/or a replacement network service is intended to include any service, network service, cloud service, collection of resources, etc. and can be accessed by an identified user via a network. Moreover, the network service 104 and/or the replacement network service 106 can provide any suitable number of services, from $service_1$ to $service_N$, where N is a positive integer.

For instance, the network service and/or replacement network service can be a cloud service. A cloud service, for example, can provide data management for a plurality of users that can access and/or maintain respective data utilizing a network such as the Internet. In another example, the network service 104 can be a cloud service that is a collection of resources that has terminated and/or is about to be dissolved due to, for instance, a buyout by a competitor. The system 100 allows the replacement network service 106 (e.g., a replacement cloud service) to provide services substantially similar to the network service 104 (e.g., the terminating cloud service).

Furthermore, a user can utilize most any service provided by the network service 104 (e.g., before termination) and/or the replacement network service 106. In general, a user can subscribe to a particular service in exchange for any suitable currency. Thus, an account can be created allowing a user to have services with specific configurations, rights, application access, etc. based at least in part upon details associated with the account. In one example, a hierarchical package structure can be employed for accounts, wherein the amount of features and functions provided can correlate to the price paid by the user per unit of time (e.g., yearly, monthly, weekly, daily, hourly, etc.). In other words, the most expensive amount can correspond to the topmost available package which can offer the most features and/or functions. Upon the termination of the network service 104, it is to be appreciated and understood that the executor component 102 can base the identification of the replacement network service 106 at least in part upon the service provided, account details, package options, rates, and/or any other suitable details related to the user, network service, and/or service provided.

In accordance with an aspect of the claimed subject matter, the executor component 102 can detect and/or ascertain termination of a dying network service based at least in part upon gathered information associated therewith. For example, the executor component 102 can evaluate financial data (e.g. earnings, client listings, activity, etc.) about a potential dissolving network service utilizing respective peers as a reference point. Based on such evaluation of the potential dissolving network service 104, the executor component 102 can prepare data migration accordingly.

In another example, the executor component 102 can provide a summarization associated with the terminating network service 104, such as meta-data describing the particular service. Moreover, the executor component 102 can utilize a broker service that can identify a compatible service based at least in part upon meta-data that describes the particular service. Based at least in part upon the summarization and/or data collected from the terminated service 104, the executor component 102 can identify a substantially similar replacement network service, which can allow a seamless migration of data to the replacement network service. In one example, the replacement network service can be the exactly same service which can allow for uninterrupted operation of service. In addition, it is to be appreciated that the executor component 102 can create a network service in the situation where a substantially similar network service exists.

In accordance with another example, the executor component 102 can implement various business model aspects such as insurance, escrow, auctions, and/or intermediaries. In general, the executor component 102 can employ "data insurance" for data associated with the network service 104 in case the company dissolves, terminates, etc. It is to be appreciated that the "data insurance" can be more akin to a traditional insurance company. If the network service 102 terminates, dissolves, etc., the insurance company can take the insured data and place in a new form of escrow such as a data escrow service. For instance, a disparate network service and/or company can purchase the data from escrow (e.g., providing the data/account to automatically transfer). In another example, the owner of the insured data in escrow can request a solicitation of offers for the rights associated therewith (e.g., solicit offers from other companies to take over the rights for the insured data). The owner of the data can then select the company/entity, wherein the data can be moved from escrow to the new company/entity.

It is to be appreciated that there can be a plurality of users, companies, entities, and the like involved with the insurance/escrow described above. For instance, the company bidding and/or giving offers may not be the initial network service that hosted the data but rather an Internet Service Vendor (ISV) that is a reseller for the terminated, dissolved, etc. network service. In other words, it is to be appreciated that there can be a very complex chain of participants associated with the offer/acceptance/sale of the insured data upon entry into escrow. In addition, there can be various ownership policies about who owns metadata and/or data between companies, users, entities, etc., wherein such ownership can be based at least in part upon service agreements with the end user. In another example, there can also be different policy around log on names (e.g., so if a user logs on with a log on name of the dead service, there is one set of things shown, which might need be slightly different if the user logs on with a federated identity system).

Following the above, the executor component 102 can further provide data and/or code transformation components (not shown). For instance, such data and/or code transformation components can save the "data." Moreover, the failed network service (e.g., terminated, dissolved, etc.) utilized proprietary data and/or algorithms underlying the unique service provided (e.g., thus giving them a competitive differentiation as a business). The terminated, dissolved, etc. network service can agree to some set of processes and/or standards such that their data and/or algorithms can be transformed in the event of a default/other business fortune. The processes and/or standards can allow the network service information to be transformed into a new and/or disparate network service (e.g., wherein the transformation can be different in each case and/or network service). Moreover, the executor component 102 can be extensible, allowing for these pluggable transformation modules. Furthermore, the executor component 102 can utilize encryption and key management. The encryption technology can utilize needs to traverse the system, either by virtue of a standard being used and keys shared appropriately (e.g., RSA encryption, etc.) or by a sequence of decrypt/encrypt operations securing the data with encryption appropriate for each step along the way.

Furthermore, the executor component 102 can handle situations associated with a group of individuals associated with at least one network service are to be terminated, dissolved, etc. For instance, a network service can instruct and/or force a group of individuals (e.g., employees, delinquent users, etc.) to leave such service. Again, it is to be appreciated and emphasized that the executor component 102 can provide any suitable data transfer to a disparate network service which can include metadata, services, portion of services, data transformation modules for adaptation, code transformation for adaptation, etc. Moreover, privacy and ownership of data can impact various business relationships in light of the executor component 102 implementing various business model aspects such as insurance, escrow, auctions, and/or intermediaries.

For instance, if migrating research prototype users to an entity (e.g., company X spaces, service, network service, etc.), there can be numerous associations between individuals which may or may not be able to be transferred. For example, a first user's "friends" link with a second user can "break" if the second user does not want to transfer to the new and/or disparate entity/company/service. Moreover, it may be grayed out if the second user has not decided, is not aware of the change, etc. In another example, the link between the first user and the second user can "break" if the company's (e.g. space, entity, etc.) code does not allow linkage between users. In still another example, the first user query "friends" might not work anymore, but the first user might want the second user to still appear as a friend even though the second user has not joined.

Furthermore, it is to be appreciated that data can be owned and/or correspond to more than one entity with a plurality of links/relationships between data. For example, a first entity and a second entity can have a shared interest and/or ownership with at least a portion of data. In another example, data can have specific relationships/links with various portions of disparate data, wherein such relationships/links can be maintained upon migration to a disparate network service. In addition, the data can be transformed in the midst of migration. For example, data that resides in a first network may require transformation and/or adaptation to thrive in a disparate network when such data migrates thereto. In such a scenario, the executor component 102 can employ licensing and/or digital rights management (DRM) to the data regardless of transformation, location, and/or residence within the network service 104, the replacement network service 106, and/or most any combination thereof. For instance, the executor component 102 can track data and/or any portions of data to ensure licensing and/or DRM characteristics are maintained such that the legalities of such data are intact.

Upon the transferring of data between various network services, the modification of data (e.g. CR, LF, or CR and LF) can invoke issues surrounding the ownership rights related to such data. For example, the executor component 102 can ascertain whether such data has been manipulated in a substantial manner in order to warrant disparate ownership rights (e.g. licensing, copyright, digital rights management, etc.). In particular, the executor component 102 can employ comparison algorithms to evaluate the disparities between original data and changed and/or manipulated data in order to determine if such changes place the data beyond the boundaries of existing ownership rights. For example, a portion of data can be migrated to the replacement network service 106, wherein such migration requires the data to be adapted to various configurations within the new environment. With the data having existing ownership rights associated therewith, the executor component 102 can evaluate whether such changes to the data invoke new ownership rights.

In still another example, the system 100 can allow specific portions of data to be selected for migration. For instance, a user can elect a first portion of data to migrate to a first replacement network service, while a second portion of data can be selected to migrate to a second replacement network service. It is to be appreciated that portions of data can migrate from network service to network service, wherein parts of the data can be identified to move, stay, delete, change, etc. Moreover, the executor component 102 can move certain portions of data to a first network service and a disparate portion of the data to a second network service. In another instance, the executor component 102 can provide duplicate migration for portions of data to identified network services.

In addition, the system 100 can include any suitable and/or necessary interface component 108 (herein referred to as "interface 108"), which provides various adapters, connectors, channels, communication paths, etc. to integrate the executor component 102 into virtually any operating and/or database system(s) and/or with one another. In addition, the interface component 108 can provide various adapters, connectors, channels, communication paths, etc., that provide for interaction with the executor component 102, network service 104, replacement network service 106, and any other device and/or component associated with the system 100.

Figure 2:
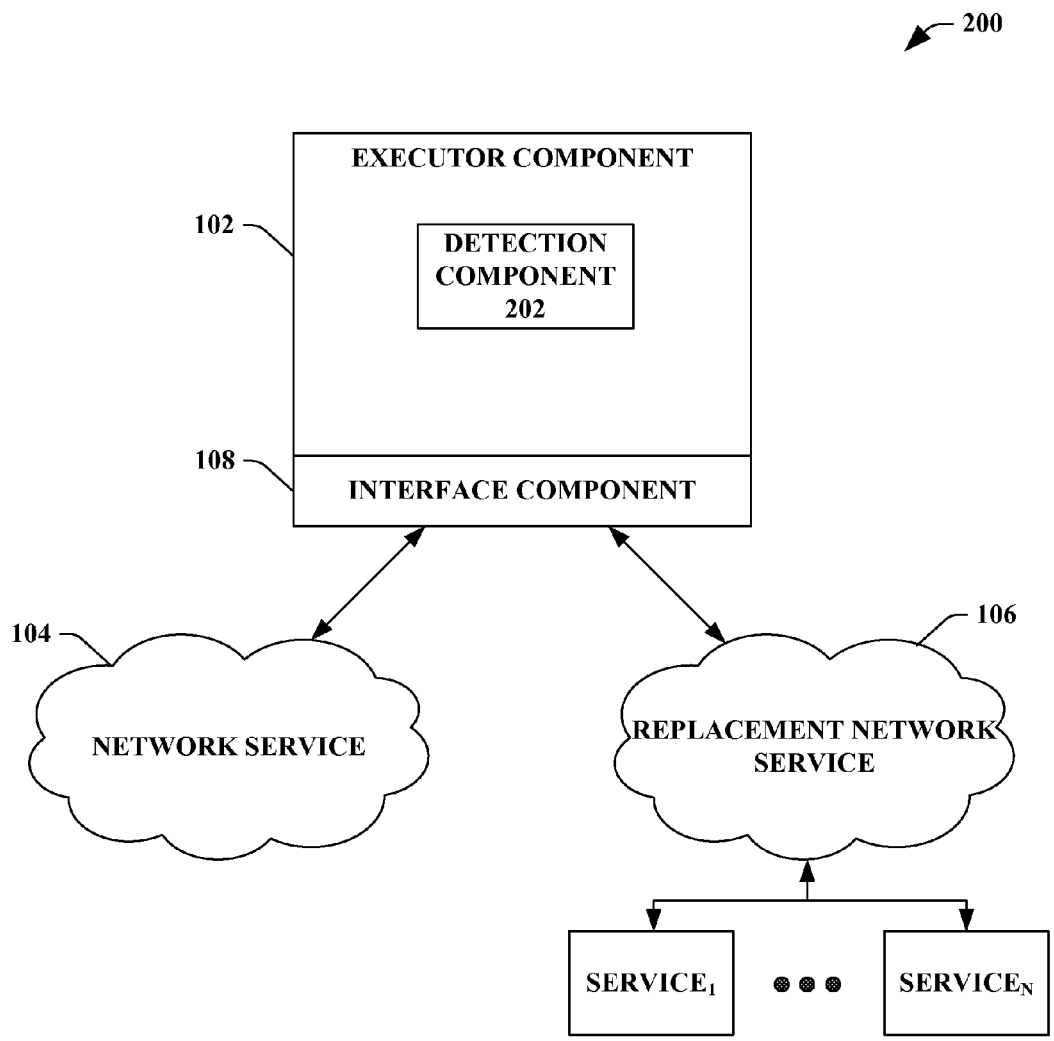
FIG. 2 illustrates a block diagram of an exemplary system that facilitates ascertaining a characteristic related to a network service ceasing to exist in order to re-assign data to a replacement network service.

FIG. 2 illustrates a system 200 that facilitates ascertaining a characteristic related to a network service ceasing to exist in order to re-assign data to a replacement network service. The system 200 can include the executor component 102 that can re-assign data from the terminating and/or terminated network service 104 to the replacement network service 106 in order to provide a user and/or machine (e.g., subscribing and/or receiving a portion of a service from the terminating network service 104) with a substantially similar service. The executor component 102 allows data migration from a dying and/or death network service 104, wherein such death or dying refers to a network service that is preparing to cease to exist, terminate business, dissolve business, re-structure, retire, shut down, etc.

For instance, a virus scanning/prevention service can be provided by a party to a user over a network; however, such service can be terminated for any particular reason. The executor component 102 can provide data migration for data associated with users related to the virus scanning/prevention service and relocate such users and/or data to a disparate network service 106 that is a non-terminating business. It is to be appreciated and understood that the network service 104 and/or the replacement network service 106 can provide at least one of a service, a plurality of services, a portion of a service, one or more services, etc. In addition, the executor component 102 can provide replacement services and/or data migration for a dying network service 104 regardless of the services provided (e.g., a portion of a service, a plurality of services, etc.). In other words, the executor component 102 can provide data migration and/or re-assignment at any suitable granular level. Thus, a portion of a first service and/or data can be migrated to a first replacement network service, while a second service and third service (and associated data) can be migrated to a second replacement network service.

The executor component 102 can include a detection component 202 that analyzes at least one network service 104 in order to provide a determination whether or not the network service 104 has dissolved, terminated, died and/or is about to dissolve, terminate, and/or die. For instance, the detection component 202 can detect a termination notification, request a termination notification, and/or anticipate a termination notification in relation to the network service 104. In another example, the detection component 202 can continuously, periodically, and/or any combination thereof "ping" the network service 104 to ensure proper responsiveness and/or activity associated with a business and/or network service that is not terminating and/or dissolved. In still another example, upon the detection of a terminated network service (not shown), the system 200 can revive the network service by utilizing any suitable rollback technique to enable a transactional system. Thus, the terminated network service can be rolled back to a state that allows data and/or service migration to be employed.

In one example, a subscription can be provided to the network service 104 and/or replacement network service 106 that allows such businesses to communicate termination status, business categorization, business area, and the like, which can ensure customers that data and/or services are protected in the unfortunate case of the business terminating and/or ending. Thus, a collection of network services can participate in this subscription that will be a selling point to customers while also protecting the service provided to customers by advertising the availability on replacement network services in the event of a closing.

In still another example, the detection component 202 can analyze data associated with the network service 104 to anticipate the upcoming termination of such network service 104. By anticipating the death and/or end of the network service 104, the executor component 102 can prepare for data migration and replacement services to be provided. In particular, the detection component 202 can analyze publicly available financial data and/or financial records in order to predict whether or not the network service 104 will terminate and/or dissolve. For instance, the following data can be analyzed to facilitate predicting the failure of the network service 104: financial records, tax information, stock prices, board member data, client information, owner data, competitor information, etc. Based at least in part upon the financial analysis provided by the detection component 202, the execution component 102 can prepare for data migration to a disparate replacement network 106 in the likelihood that a termination notification will be sent, received, and/or requested. It is to be appreciated that the detection component 202 can utilize a threshold that can be met in order for the termination determination to be deemed accurate. In another example, the detection component 202 can analyze technical and/or mechanical conditions associated with the network service 104 to anticipate data and/or service migration. In yet another instance, the network service 104 can provide a health indicator component (not shown) that can be utilized to inspect the health of the system 200. Thus, the health indicator component can inspect a disk to ascertain that such disk is becoming increasingly faultier and such disk should be replaced and/or removed from the network service 104. It is to be appreciated that the health indicator component can provide such health and/or life details associated with the network much like a battery meter on a laptop and/or a gas meter on a car, wherein both can indicate a life expectancy that will need replenishing and/or serviced.

Figure 3:
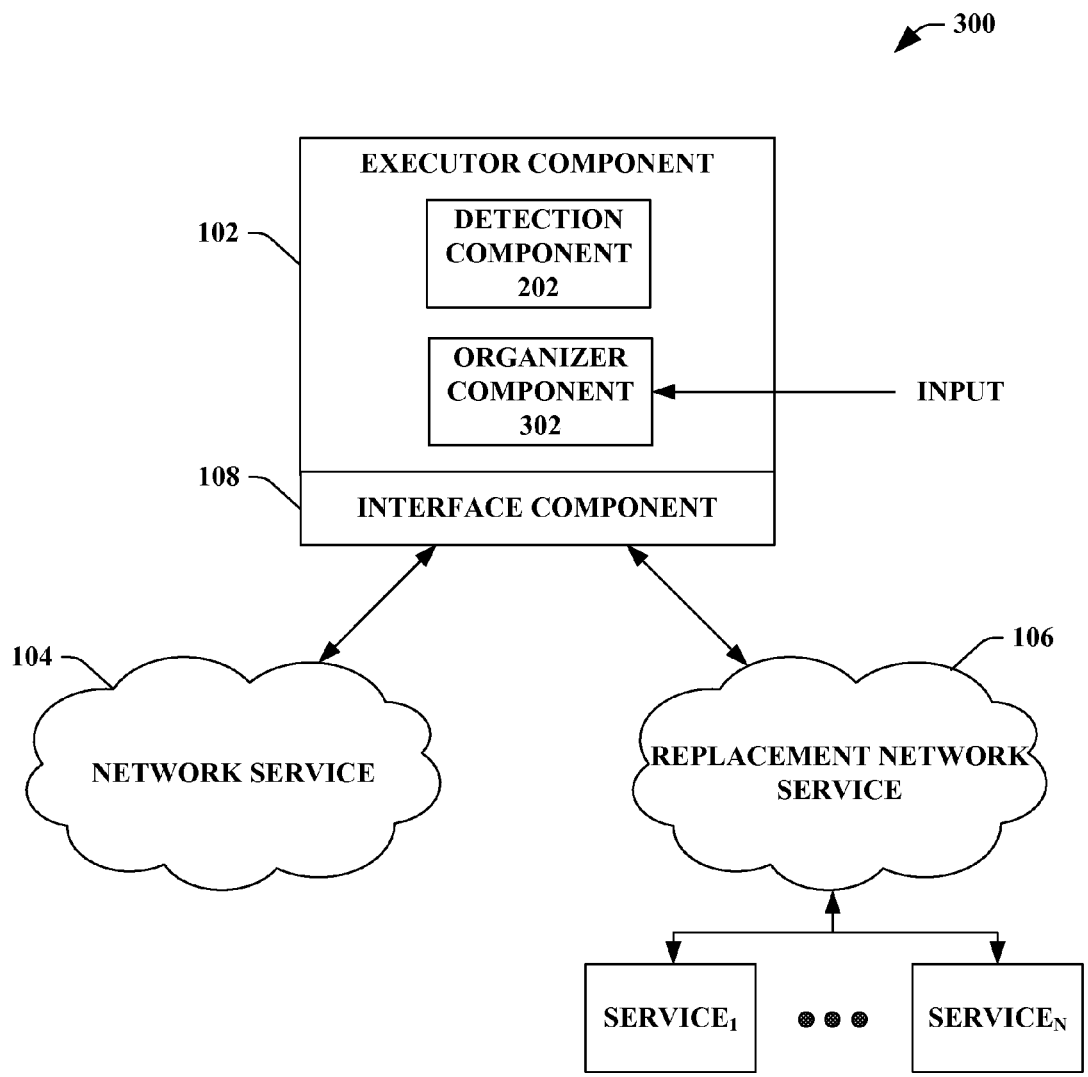
FIG. 3 illustrates a block diagram of an exemplary system that facilitates hierarchically organizing data associated with a terminated network service allowing the efficient migration of data to a disparate network service.

FIG. 3 illustrates a system 300 that facilitates hierarchically organizing data associated with a terminated network service allowing efficient migration of data to a disparate network service. The executor component 102 within the system 300 can provide for replacement services and/or data migration from a terminating and/or terminated network service 104 to a replacement network service 106 in a seamless manner to facilitate providing at least one resource/service to a user. Moreover, the executor component 102 can utilize the detection component 202 to analyze a portion of the network service 104 to ascertain whether or not the network service 104 is terminating, about to terminate, and/or has terminated business.

The executor component 102 can further include an organizer component 302 that can prioritize data for migration in the event of the network service 104 ceasing to exist. The organizer component 302 can structure and/or rank data based on criteria associated with data importance. Thus, when the network service 104 has been verified as being terminated, the data associated with the terminating network service 104 can be evaluated, which can provide for efficient data migration to the replacement network service 106. In other words, a portion of data may be re-assigned to the replacement network service 106 rather than the entirety of the data associated with the terminating network service 104.

For instance, the criteria to evaluate the data to be migrated can be pre-defined, dynamically determined, ascertained on a case-by-case basis, and/or any combination thereof The criteria can be associated with user activity (e.g., active accounts can have priority over inactive accounts), user account data (e.g., fees paid on time, active account, payment history), user membership length (e.g., longer membership has priority), replacement network service criteria (e.g., replacement business may have a preference), replacement business evaluations (e.g. replacement business observations and/or tendencies), terminated network service recommendations, user preferences (e.g. contact user to inquire about replacement network service 106), etc.

In another example, the organizer component 302 can receive an input related to providing guidance in sorting through data that is to be migrated to the replacement network service 106, discarded, stored, and/or transmitted to a respective owner/user. In particular, the organizer component 302 can utilize pre-defined criteria to evaluate data, yet upon a new and/or unforeseen circumstance, the organizer component 302 can request assistance in ranking and/or evaluation. Thus, the input can be utilized to guide and/or instruct the organizer component 302 on how to handle data related to the terminating network service 104. Moreover, it is to be appreciated that the organizer component 302 can be trained (e.g. receiving inputs associated with the data) and then switch to an automatic technique (e.g., utilizing the input for an unforeseen and/or untrained circumstance).

Figure 4:
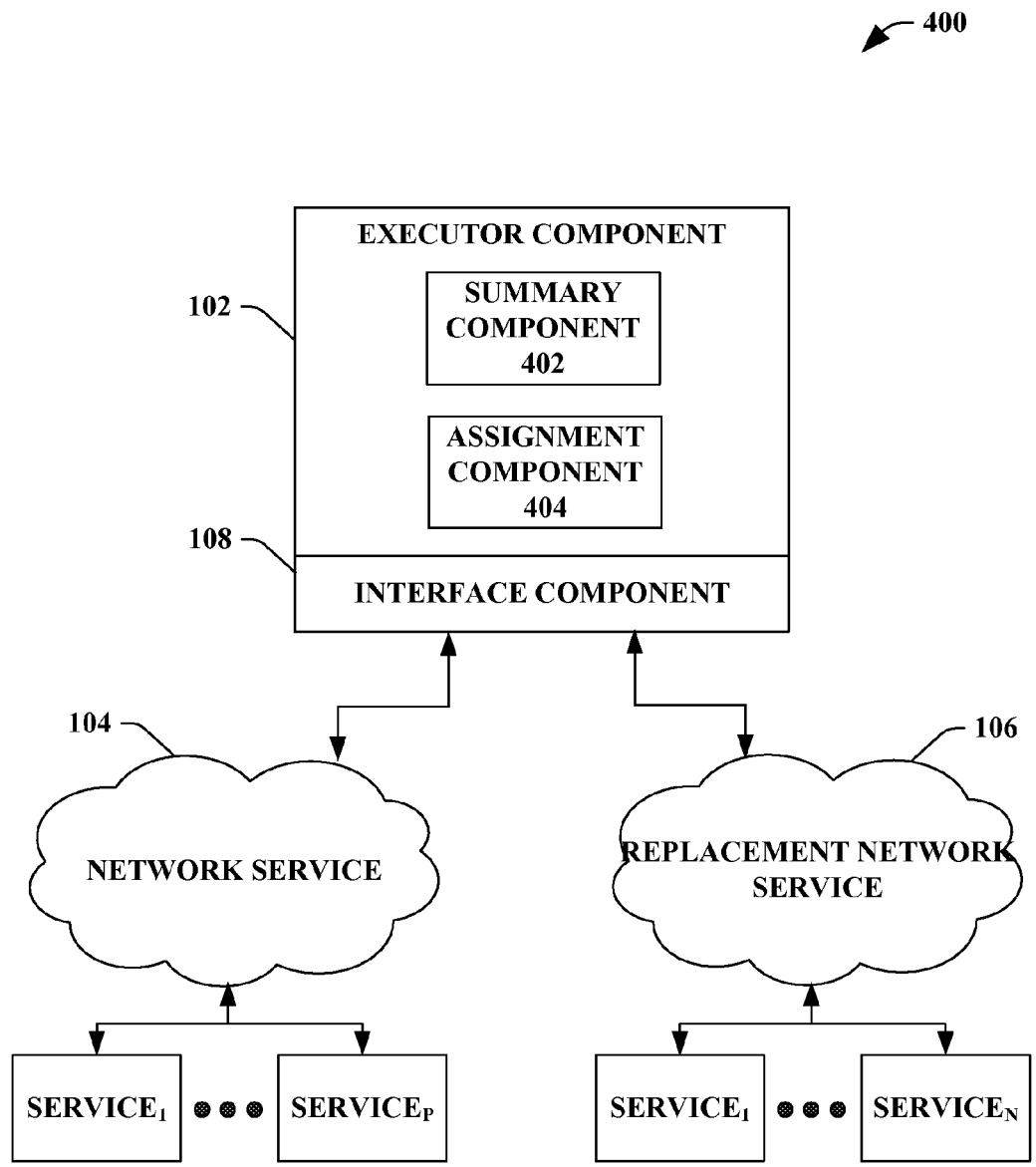
FIG. 4 illustrates a block diagram of an exemplary system that facilitates collecting information related to a dissolving network service to employ a substantially similar replacement network service.

FIG. 4 illustrates a system 400 that facilitates collecting information related to a dissolving network service to employ a substantially similar replacement network service. The system 400 can include the executor component 102 that facilitates data migration and/or re-assigning a portion of a service to the replacement network service 106 in light of the network service 104 terminating and/or ceasing to provide a service. It is to be appreciated that the terminating network service 104 can provide any suitable number of services, from service$_1$ to service$_p$, where P is a positive integer. Moreover, the executor component 102 can provide data migration and re-assignment of services for at least one service associated with the network service 104. In other words, if a portion of the network service 104 ceases to exist, the executor component 102 can re-assign such portion of the service and provide data migration to the replacement network service 106.

The system 400 can further include a summary component 402 that can employ a synopsis related to a terminating and/or terminated network service 104. The summary component 402 can collect specific data associated with the terminated network service 104 that enables the executor component 102 to identify a suitable and/or comparable replacement network service 106. For example, the summary component 402 can collect data such as, but not limited to, network service(s) provided to user(s), client listings, client data, client account data, available services, packages available for customers, business structure data, and/or any suitable data related to the terminating and/or terminated network service 104, a provided service, and/or a user. Moreover, the summary component 402 can utilize meta-data associated with the service, wherein a broker service can identify a suitable replacement based at least in part upon the meta-data.

The executor component 102 can utilize an assignment component 404 that facilitates re-locating data to the replacement network service 106 and further hand-off a portion of a service to the replacement network service 106. The assignment component 404 can provide data migration to a replacement network service 106 based at least in part upon the summary component 402, a pre-defined assignment, a recommendation, a matching algorithm, and/or any suitable technique utilized to ascertain an analogous network service in comparison to the terminating and/or terminated network service 106. For instance, a termination notification can be received, requested, and/or transmitted, which can include a recommendation on a replacement network service for data migration and/or relocation for a portion of a service. In still another example, the assignment component 404 can evaluate most any available network services and determine which can be suitable replacements and/or substantially similar to any terminated and/or terminating network services. Moreover, it is to be appreciated that the assignment component 404 can utilize manual assignments and/or recommendations.

Figure 5:
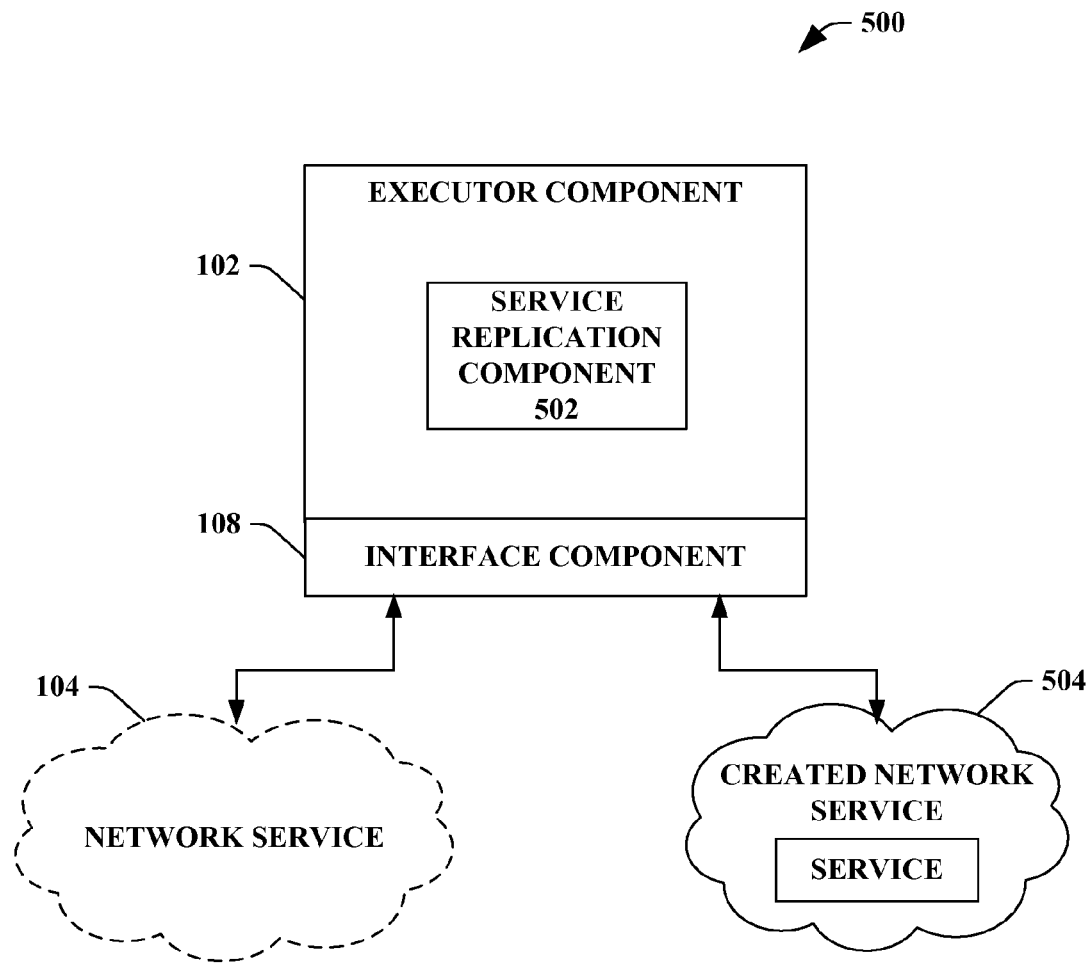
FIG. 5 illustrates a block diagram of an exemplary system that facilitates re-assigning data from a terminated network service to a newly created network service.

FIG. 5 illustrates a system 500 that facilitates re-assigning data from a terminated network service to a newly created network service. The executor component 102 can provide data and/or service management associated with a network service 104 that is about to terminate, in the process of terminating, and/or terminated. The system 500 enables the executor component 102 to provide orphaned data and/or services (e.g., services and/or data associated with a network service that has died and/or is in the process of dying) with a replacement (e.g., foster) network service (not shown). It is to be appreciated that the network service 104 is depicted in dotted lines to indicate its inevitable death and/or termination.

The system 500 can further include a service replication component 502 that can create a new network service 504 (also referred to as the newly created network service) that provides at least one service substantially similar to the network service 104 that is ending and/or has dissolved. Moreover, it is to be appreciated that the system 500 can employ data migration as well as code migration, service replication, etc. when a network service has terminated, is terminating, and/or has plans to terminate and the subject innovation is not so limited to a particular moment in the termination and/or dissolution process. For example, the executor component 102 can identify a network service that will cease to exist and/or has ended business. Upon such detection, the executor component 102 can evaluate available network services that can replace the terminating network service 104 and provide analogous services. Moreover, upon such detection, the services can be provided by the identified similar network service and data can be migrated thereto. However, if a suitable network service cannot be identified, the service replication component 502 can create a network service that can provide the service similar to the terminated network service and also re-assign data (from the terminated network service) to the newly created network service 504. In one example, the system 500 can provide the service until a suitable replacement is created, found, and/or identified. Thus, the created network service 504 can be utilized until a disparate network service comes into existence (e.g. independent of the executor component 102) to provide the service and/or data migration.

Figure 6:
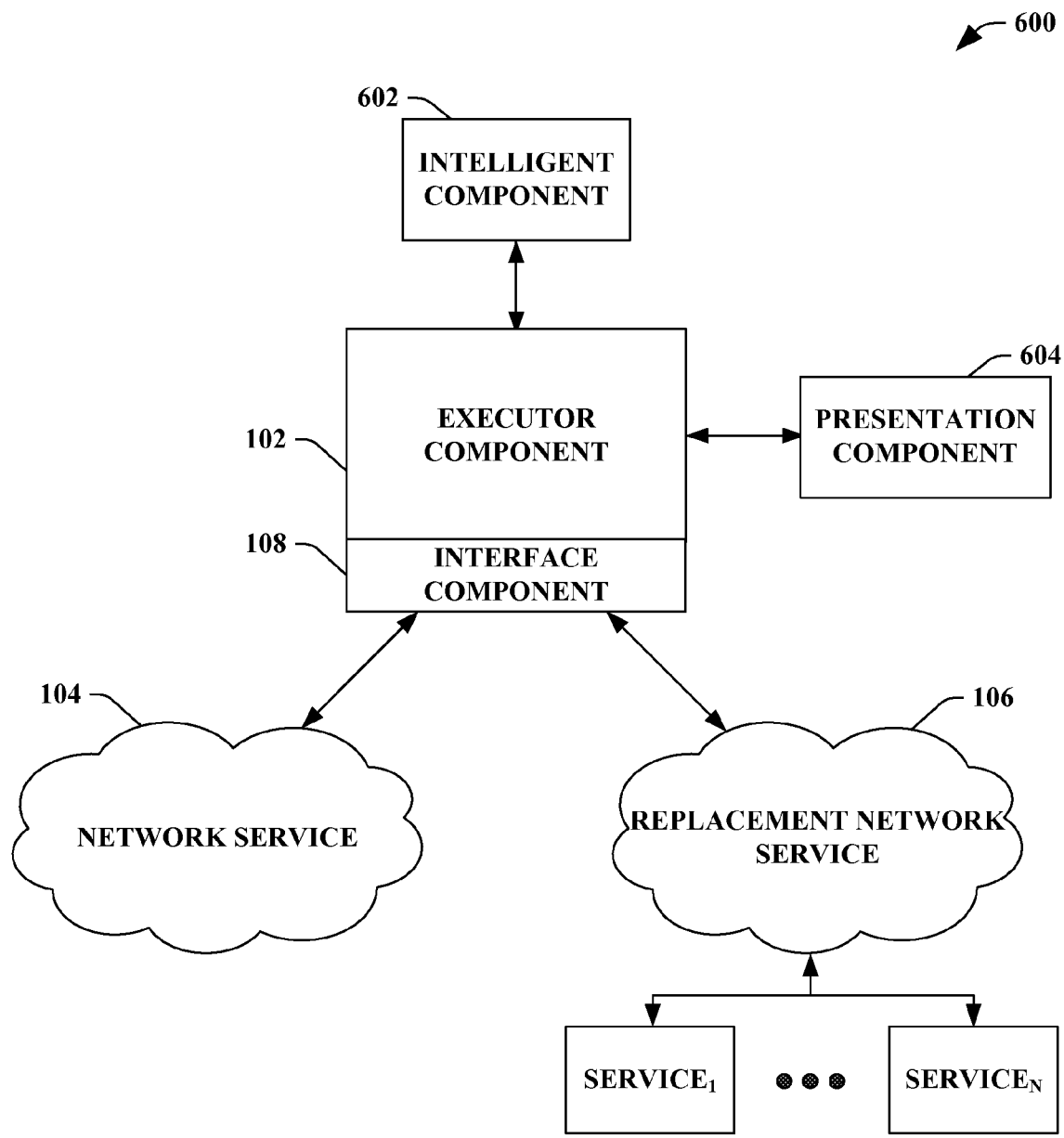
FIG. 6 illustrates a block diagram of an exemplary system that facilitates migrating data related to a terminated network service to a replacement network service.

FIG. 6 illustrates a system 600 that employs intelligence to facilitate migrating data related to a terminated network service to a replacement network service. The system 600 can include the executor component 102, the network service 104, the replacement network service 106, and the interface component 108, which can be substantially similar to respective components, services, network services, interfaces, and interface components described in previous figures. The system 600 further includes an intelligent component 602. The intelligent component 602 can be utilized by the executor component 102 to facilitate accurately migrating data from a terminated and/or terminating network service to a replacement service that provides substantially similar resources. For example, the intelligent component 602 can infer termination of a network service, data importance to a replacement network service, data relevancy, user activity related to an account associated with a network service, summarization of services provided related to a network service, replication of dissolving network service, assignment of network service to replace a terminated network service, anticipation of a dissolution of a network service and/or business, newly created network service configurations, sorting of data to replacement network service(s), etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The executor component 102 can further utilize a presentation component 604 that provides various types of user interfaces to facilitate interaction between a user and any component coupled to the executor component 102. As depicted, the presentation component 604 is a separate entity that can be utilized with the executor component 102. However, it is to be appreciated that the presentation component 604 and/or similar view components can be incorporated into the executor component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the executor component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
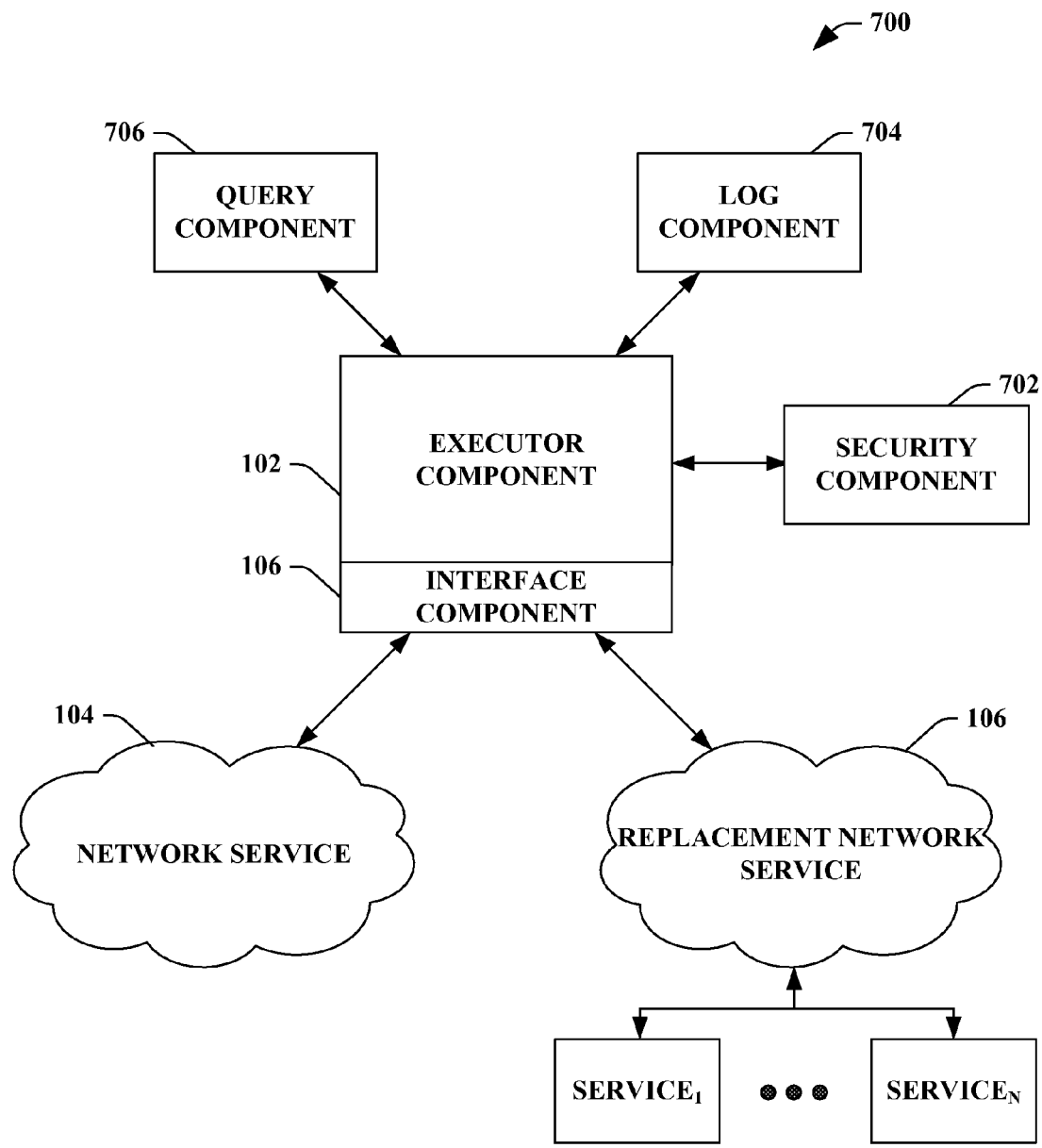
FIG. 7 illustrates a block diagram of an exemplary system that facilitates employing an analogous network service in the event of the dissolution of a network service.

FIG. 7 illustrates a system 700 that facilitates employing an analogous network service in the event of the dissolution of a network service. The system 700 can include a security component 702 that can ascertain which operations related are authorized to manipulate and/or execute. In accordance with one example, a user may only be authorized to perform a certain re-assignment of a portion of a service, while not authorized to initiate a disparate re-assignment of a portion of a service. In addition, the user may be able to relocate a portion of data, while not authorized to relocate a disparate portion of data. The security component 702 can determine identity of a user by analyzing, for instance, usernames, passwords, personal identification numbers, personal status, management positions, occupation hierarchy, and the like. Furthermore, the security component 702 can determine a user's identity by analyzing biometric indicia, such as voice recognition, fingerprint analysis, retina analysis, etc. By providing identification of a user, specific rights can be attached and/or associated therewith to allow a hierarchical rights structure to protect the integrity of any data and/or data manipulation associated with the system 700.

Still further, the security component 702 can perform granular security with respect to a user, a portion of a service, a collection of services, a user account, a replacement network service, a network service, a service, etc. Pursuant to one example, a user's rights with respect to a particular terminated network service 104 can change as time alters. For instance, certain operations associated with terminated network services and/or replacement network services performed by a user can be allowable by the user during a first shift but not allowable to the user during a second shift. Additionally, the security component 702 can provide different measures of security given different states of data migration, service re-location, and/or termination process. Therefore, for example, a user may have rights with respect to performing a data migration in a first state of the termination process for the network service 104 but may have different rights with respect to the same operation in a second state of the termination process for the network service 104.

The system 700 can further include a log component 704 that can work in conjunction with the executor component 102, the terminated network service 104, any existing network service (not shown), the replacement network service 106, the security component 702, and/or any combination thereof in order to track any data related to the system 700. For instance, the log component 704 can track and/or record data related to the terminated network services, state of the terminating network service, summary data associated with the network service, replacement services available, assignment of replacement service, data migration, user account details, user listings, services provided, location of data from a terminated network service, etc. Moreover, the log component 704 can track various user data in connection with any security and/or authorization utilized with the system 700. In such a case, the log component 704 can track which particular user initiated a specific data migration and/or service re-assignment.

Moreover, the system 700 can include a query component 706 that allows the querying of such data stored and/or logged. In other words, the query component 706 can allow a user to search any data associated with the system 700. In particular, a particular terminated network service can be identified and/or any other data related thereto. Moreover, terminated network services can be queried to locate the migration location of data and/or relocation of services (e.g. identifying the particular replacement network service). In still another example, the system 700 can be queried to locate a specific and/or particular user and/or users.

The system 700 can further include a data store (not shown) that can include any suitable data related to the executor component 102, the terminating and/or terminated network service 104, the replacement network service 106, etc. For example, the data store that can include, but not limited to including, listing of replacement network services, terminated network service names, user account information, data migration configurations, security settings, user data, financial records, historic data, service data, network service and/or replacement network service summarization data, etc. In one example, the executor component 102 can store summarization data associated with a network service and utilize such data to evaluate and identify a network service that is analogous to a terminating network service, wherein data and/or services can be re-assigned to a network service based on such identification.

It is to be appreciated that the data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 8:
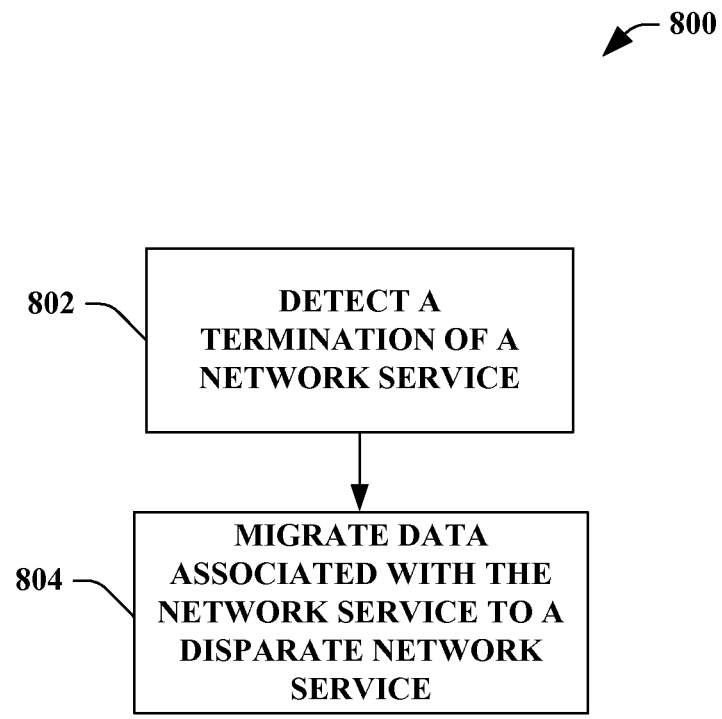
FIG. 8 illustrates an exemplary methodology for migrating data associated with a network service to a disparate network service maintaining data entirety and integrity.
Figure 9:
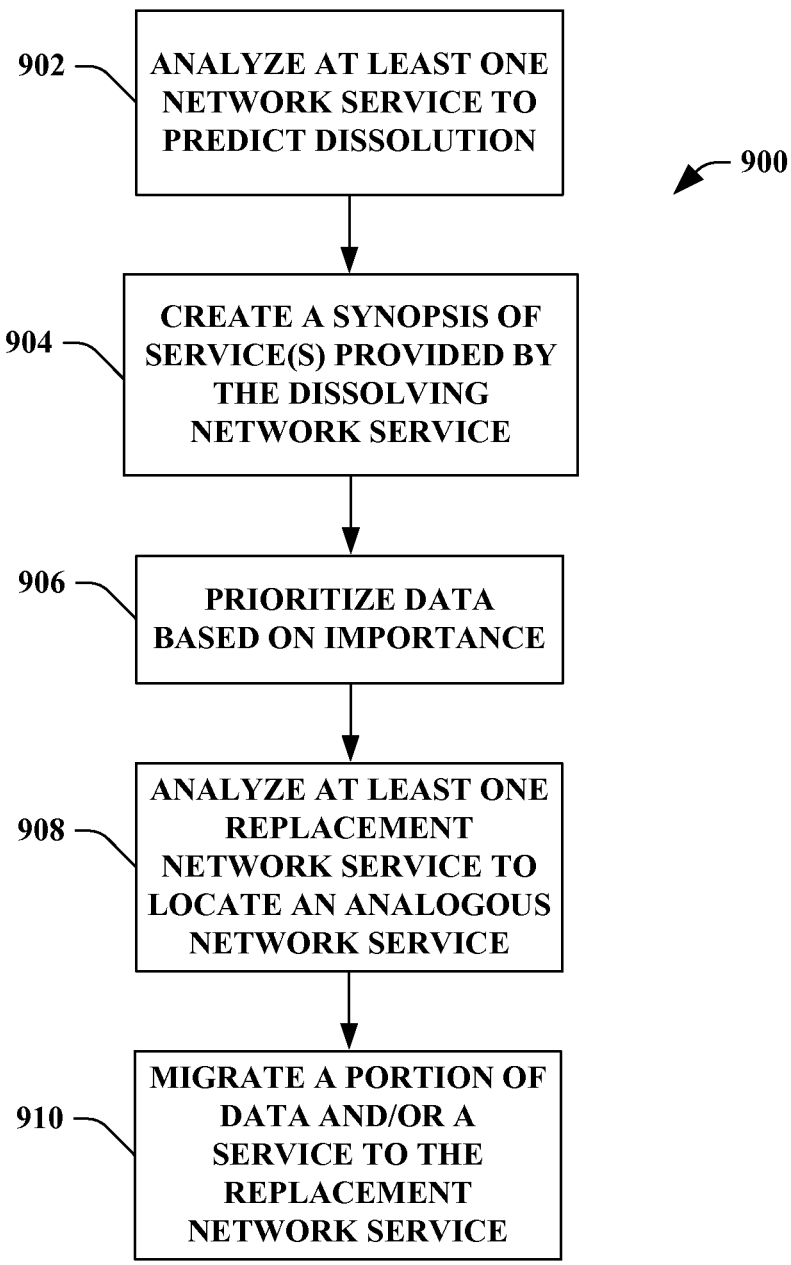
FIG. 9 illustrates an exemplary methodology for ascertaining a characteristic related to a network service ceasing to exist in order to re-assign data to a replacement network service.
Figure 10:
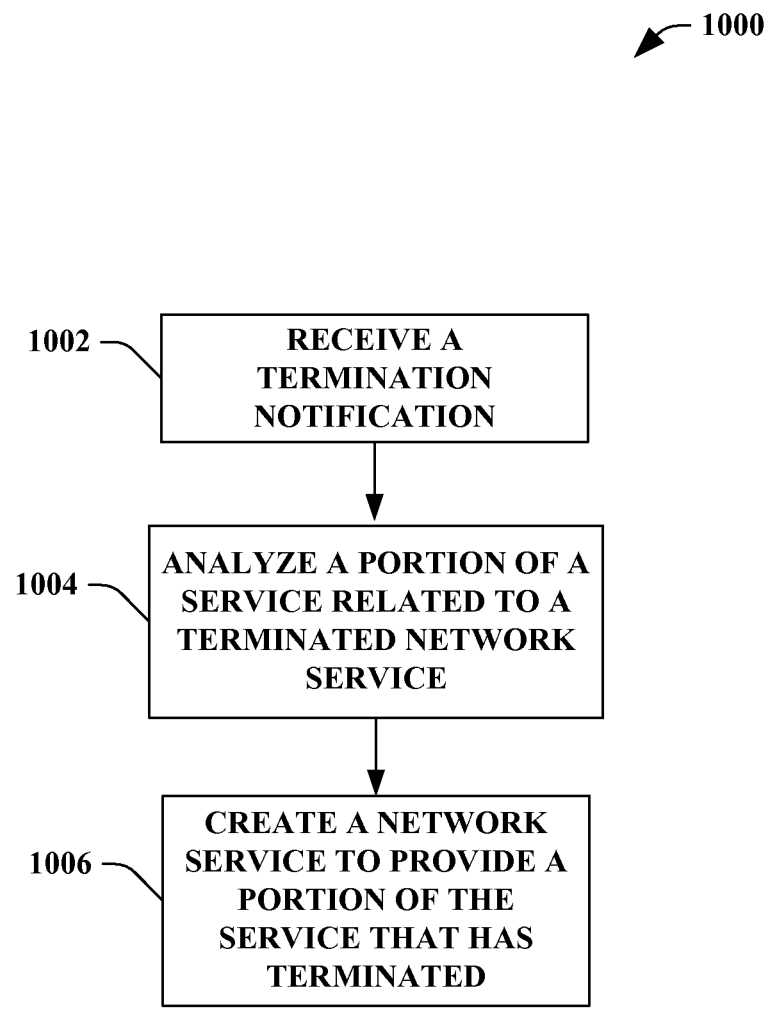
FIG. 10 illustrates an exemplary methodology that facilitates re-assigning data from a terminated network service to a newly created network service.

FIGS. 8-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for migrating data associated with a network service to a disparate network service maintaining data entirety and integrity. At reference numeral 802, a termination of a network service can be detected. The detection can relate to a network service terminating, terminated, and/or in the process of terminating. Terminating and/or terminated can refer to known and/or unknown circumstances, wherein the network service can die and/or cease to exist (e.g. planned dissolution, filing bankruptcy, retiring, a buyout, a termination of services based on geography, etc.). For instance, a termination notification, a request a termination notification, and/or an anticipation of a termination notification can be detected in relation to the network service. In another example, a network service can be polled and/or pinged continuously, periodically, and/or any combination thereof to ensure proper responsiveness and/or activity associated with a business and/or network service that is not terminating and/or dissolved.

At reference numeral 804, data associated with the network service that is terminating and/or terminated can be migrated to a disparate replacement network service. Furthermore, the disparate replacement network service can employ at least a portion of the service provided by the terminating and/or terminated network service. In other words, the data migration and/or service relocation can ensure a seamless hand-off of any portion of a service and/or data associated with the terminated network service to the replacement network service such that any service related to the data provided by the network service can be employed by the replacement network service. In one particular example, a termination notification related to the network service can be received, wherein based on such termination notification; the suitable replacement network service can be identified for data migration thereto. It is to be appreciated that the terminated and/or terminating network service can be evaluated to allow the identification of a suitable and/or analogous network service that provides substantially similar resources and/or services.

FIG. 9 illustrates a methodology 900 for ascertaining a characteristic related to a network service ceasing to exist in order to re-assign data to a replacement network service. At reference numeral 902, at least one network service can be analyzed to predict dissolution and/or termination of business. For instance, polling and/or pinging can be provided to ascertain responsiveness and/or lack thereof In another instance, customer satisfaction, opinions, and/or polls can be evaluated to gauge the success of a business. In another example, financial data can be analyzed to facilitate detection of a terminating and/or terminated network service. In particular, publicly available financial data and/or financial records can be analyzed in order to predict whether or not the network service will terminate and/or dissolve. For instance, the following data can be analyzed to facilitate predicting the failure of the network service: financial records, tax information, stock prices, board member data, client information, owner data, competitor information, etc. Based at least in part upon the financial analysis provided a determination can be assessed related to the likelihood that a termination notification will be sent, received, and/or requested.

In still another example, a subscription can be provided to the network service that allows such businesses to communicate termination status, business categorization, business area, and the like, which can ensure customers that data and/or services are protected in the unfortunate case of the business terminating and/or ending. Thus, a collection of network services can participate in this subscription that will be a selling point to customers while also protecting the service provided to customers by advertising the availability on replacement network services in the event of a closing.

At reference numeral 904, a synopsis of service(s) can be created, wherein the service(s) are provided by the dissolving network service. Specifically, the terminating and/or terminated network service can be evaluated to ascertain data residing therewith and/or any services provided to at least one user. Specific data associated with the terminated network service can be collected that can enable the identification of a suitable and/or comparable replacement network service (discussed below). For example, the collected data can be, but not limited to, network service(s) provided to user(s), client listings, client data, client account data, available services, packages available for customers, business structure data, and/or any suitable data related to the terminating and/or terminated network service, a provided service, and/or a user.

At reference numeral 906, data can be prioritized based on importance to at least one of the terminating/terminated network service, the replacement network service, and/or a user input. The data can be structured and/or ranked based on criteria associated with data importance. Thus, when the network service has been verified as being terminated or in the process of termination, the data associated with the terminating network service can be evaluated, which can provide for efficient data migration to a replacement network service. In other words, a portion of data may be re-assigned to the replacement network service rather than the entirety of the data associated with the terminating network service.

For example, the criteria to sort the data to be migrated can be pre-defined, dynamically determined, ascertained on a case-by-case basis, and/or any combination thereof. Moreover, the criteria can be associated with user activity (e.g. active accounts can have priority over inactive accounts), user account data (e.g., fees paid on time, active account, payment history), user membership length (e.g., longer membership has priority), replacement network service criteria (e.g., replacement business may have a preference), replacement business evaluations (e.g. replacement business observations and/or tendencies), terminated network service recommendations, user preferences (e.g. contact user to inquire about replacement network service), etc.

In another example, an input can be received to facilitate sorting through data that is to be migrated to the replacement network service, discarded, stored, and/or transmitted to a respective owner/user. In particular, pre-defined criteria can be utilized to evaluate data, yet upon a new and/or unforeseen circumstance, assistance can be requested to a user for ranking and/or evaluation. Thus, the input can be utilized to guide and/or instruct on how to handle data related to the terminating network service.

At reference numeral 908, at least one replacement network service can be analyzed to locate an analogous network service. Based at least in part upon the services provided by the terminating and/or terminated network service, the synopsis of the service(s) provided, etc., an analogous network service can be identified. At reference numeral 910, a portion of data and/or service can be migrated to the replacement network service. It is to be appreciated that the re-assignment of data and/or services can be based at least one of the synopsis/summary of the network service, a pre-defined assignment, a recommendation, a matching algorithm, and/or any suitable technique utilized to ascertain an analogous network service in comparison to the terminating and/or terminated network service.

FIG. 10 illustrates a methodology 1000 that facilitates re-assigning data from a terminated network service to a newly created network service. At reference numeral 1002, a termination notification can be received. It is to be appreciated that the termination notification can be requested, solicited, transmitted, and/or anticipated. At reference numeral 1004, a portion of a service related to a terminated network service can be analyzed. For example, a summarization/synopsis (e.g., utilizing meta-data associated with the service) can be created by the terminated network service and/or a disparate entity to allow a proper re-assignment of data and/or service(s) (e.g., utilizing a broker service for instance). Yet, in one example, an analogous network service may not exist for the terminating and/or terminated network service. In such a case, the methodology 1000 proceeds to reference numeral 1006.

At reference numeral 1006, a new network service can be created to provide a portion of the service that has terminated with the network service going out of business (e.g., migrating code as well as migrating data and/or services). In other words, if a suitable network service cannot be identified, a network service can be created that can provide the service similar to the terminated network service and also re-assign data (from the terminated network service) to the newly created network service. In one example, the service can be provided until a suitable replacement is created, found, and/or identified. Thus, the created network service can be utilized until a disparate network service comes into existence provide the service and/or data migration.

Figure 11:
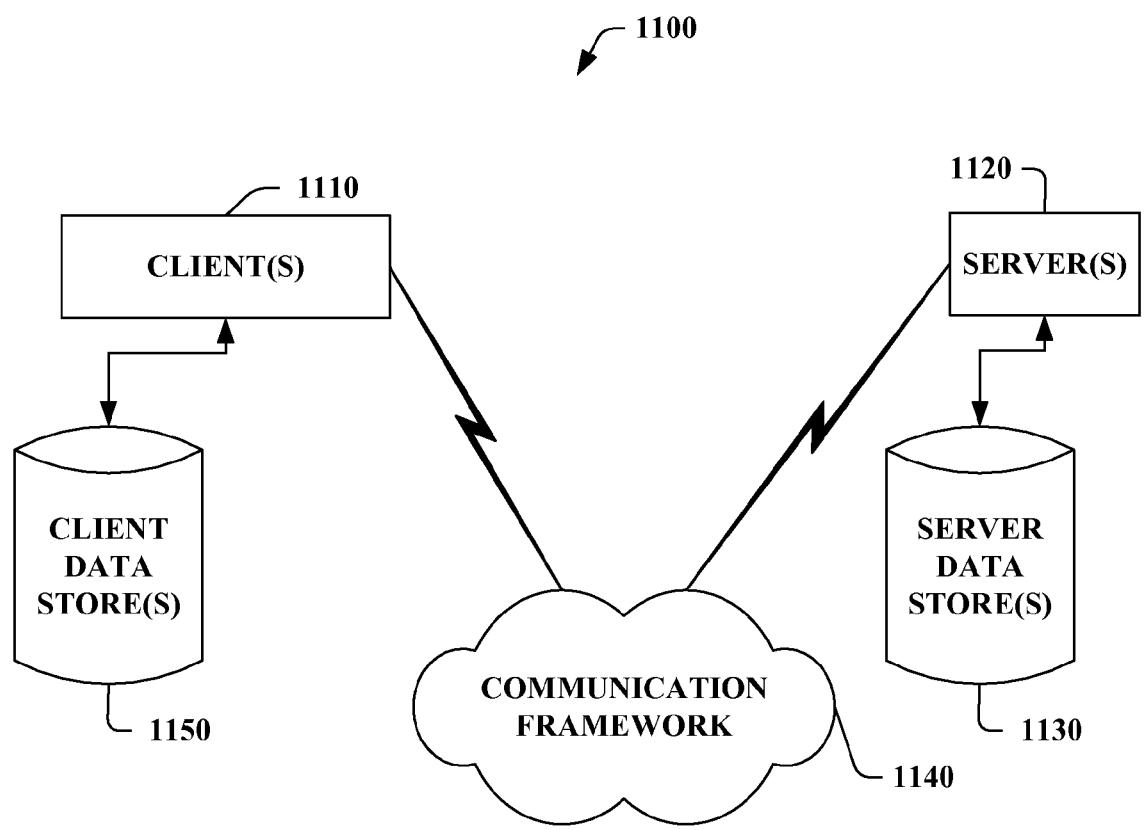
FIG. 11 illustrates an exemplary networking environment, wherein the novel aspects of the claimed subject matter can be employed.
Figure 12:
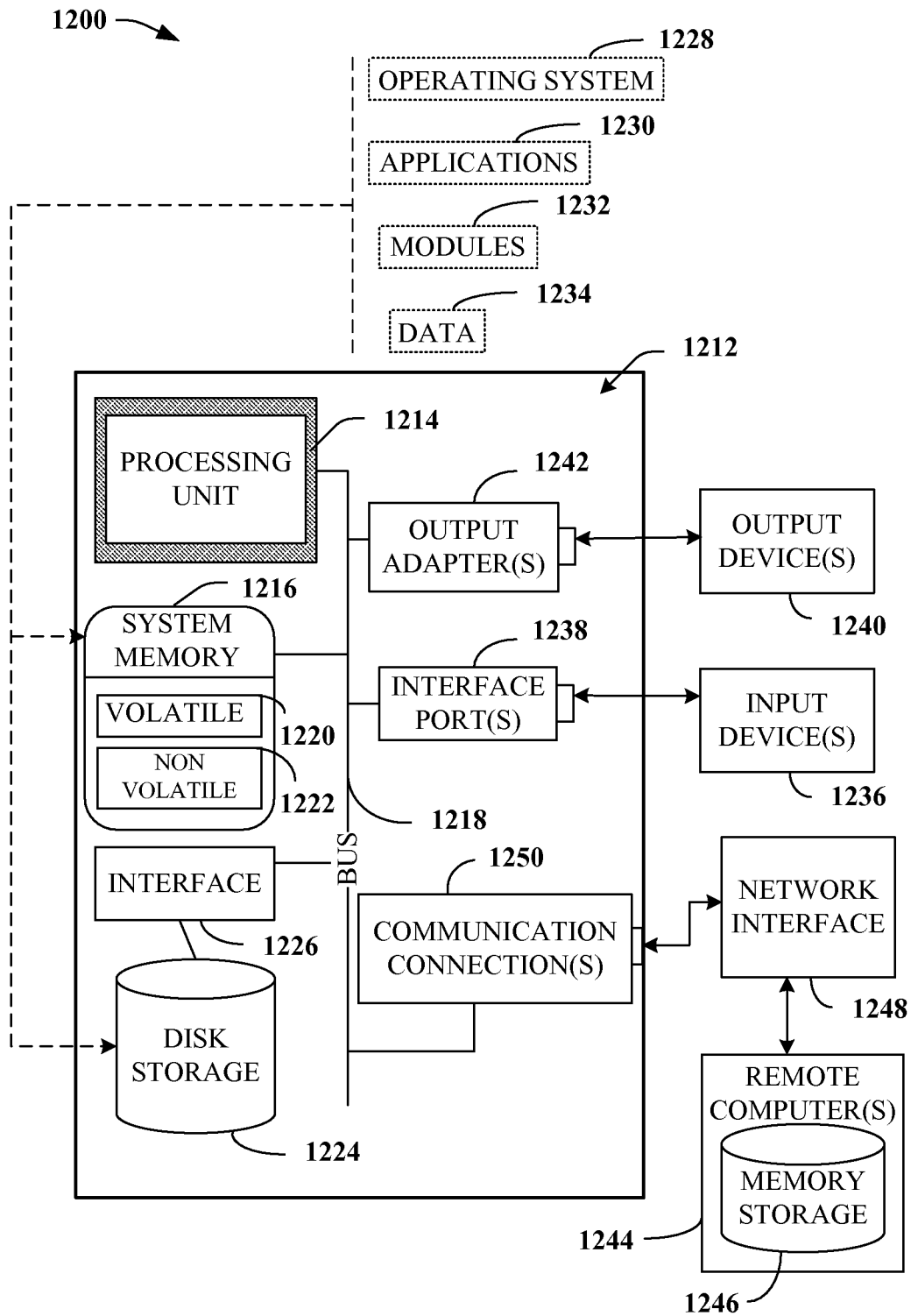
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, an executor component that facilitates migrating data from a terminated network service to a replacement network service, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240.

Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
    a processor;
    an interface, operable by the processor, that receives a termination notification associated with a network service and a request to migrate at least a portion of prioritized data associated with the network service in anticipation of a termination of the network service; and
    an executor component, operable by the processor, that in response to receiving the termination notification and the request:
        transfers the portion of prioritized data associated with the network service to a data service escrow entity;
        requests and receives solicitation offers, after the portion of the prioritized data is transferred to the data service escrow entity and on behalf of an owner of the portion of prioritized data, from a plurality of disparate entities for rights to store the portion of prioritized data;
        provides the solicitation offers to the owner of the portion of prioritized data for approval;
        receives a selection from the owner of the portion of prioritized data approving the rights for at least one of the plurality of disparate entities to store the portion of prioritized data; and
        moving the portion of prioritized data from the data service escrow entity to the at least one of the plurality of disparate entities responsive to receiving the termination notification and the request.

2. The system of claim 1, wherein the portion of prioritized data comprises at least one of metadata related to the network service, code, a service provided by the network service, a portion of service provided by the network service, service replication, service transfer, a module for adapting data from the network service to the at least one of the plurality of disparate entities, or a portion of code for transforming data to the at least one of the plurality of disparate entities.

3. The system of claim 1, wherein the executor component employs data insurance for the portion of prioritized data, the data insurance being purchased prior to the interface receiving the termination notification so that the portion of prioritized data is protected in an event of the termination of the network service.

4. The system of claim 3, wherein the termination of the network service is based on at least one of a retirement, a bankruptcy, a buy-out, a dissolution, the network service dissolving, filing bankruptcy, a closing, a shut down, a strike, a buyout, the network service ceases to exist, a planned dissolution, a termination of services based on geography, or a re-structuring.

5. The system of claim 3, further comprising at least one ownership policy associated with the insured portion of prioritized data between users, companies, entities, network services, and participants, wherein ownership is based at least in part upon a service agreement with the owner of the portion of prioritized data.

6. The system of claim 5, wherein the ownership policy corresponds to at least one of a log on name, user identification, and an account.

7. The system of claim 1, further comprising a data transformation component that adapts data to the at least one of the plurality of disparate entities for implementation.

8. The system of claim 7, wherein the data transformation component manipulates at least one of proprietary data and an algorithm underlying the network service to the at least one of the plurality of disparate entities for seamless integration.

9. The system of claim 8, wherein the executor component is extensible allowing the data transformation component to be pluggable thereto.

10. The system of claim 1, wherein the executor component employs at least one of encryption and key management such that the system is traversed by at least one of RSA encryption or a sequence of decryption and encryption operations securing the portion of data.

11. The system of claim 1, further comprising a web application implemented within the network service that retains state within the network service, wherein the network service is a resource that is maintained by a party and accessible by an identified user over a network.

12. The system of claim 11, wherein the party is at least one of a third-party or an off-site party.

13. The system of claim 1, wherein the portion of prioritized data corresponds to a user, a machine, a computer, an individual, employees, the owner of the portion of prioritized data or a delinquent user.

14. A method comprising:
subscribing a consumer to a network service that implements data insurance for a portion of data in case of a termination of the network service;
receiving a termination notification of the network service that anticipates the termination of the network service;
receiving a request to migrate the insured portion of data associated with the network service;
responsive to receiving the termination notification and the request to migrate, prioritizing the insured portion of data for migration over uninsured portions of data;
placing the insured portion of data in a data escrow service prior to the termination of the network service;
soliciting, after the insured portion of data is placed in the data escrow service, a plurality of different offers from a plurality of companies for a right to manage the insured portion of data for the consumer;
identifying one company from the plurality of companies based on an examination of the plurality of different offers; and
transferring, by a processor, the insured portion of data associated with the network service from the data escrow service to the identified company.

15. The method of claim 14, further comprising:
providing, for approval, the plurality of different offers to the consumer who entered into a consumer subscription for the network service;
receiving, as approval from the consumer, a selection of an offer and the identified company associated with the selected offer that receives the right to manage the insured portion of data;
and
providing an analogous service in comparison to the terminated network service.

16. The method of claim 14, wherein the insured portion of data comprises at least one of metadata related to the network service, code, a service provided by the network service, a portion of service provided by the network service, service replication, service transfer, a module for adapting data from the network service to the identified company, or a portion of code for transforming data to the identified company.

17. A computer-implemented method, comprising:
implementing, by a processor, data insurance for a portion of data associated with a network service in case of a termination of the network service;
receiving a termination notification and a request to migrate data associated with the network service in anticipation of the network service terminating;
prioritizing the insured portion of data for migration over uninsured portions of data;
placing the insured portion of data in a data escrow service;
soliciting, after the insured portion of data is placed in the data escrow service, offers from a plurality of companies for a right to store the insured portion of data; and
transferring the insured portion of data from the data escrow service to one of the plurality of companies based in part on a selected offer.

* * * * *